Figure 1:
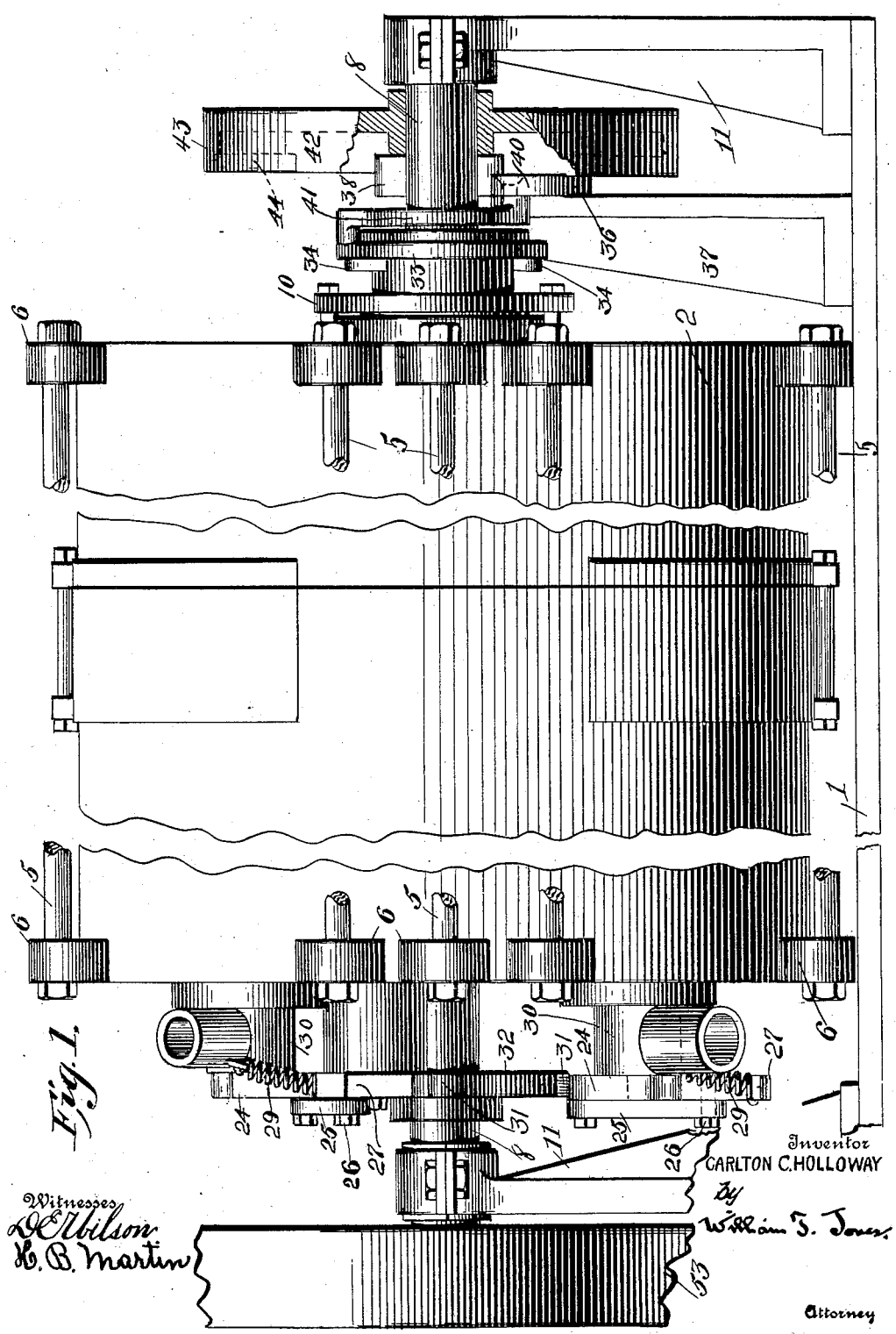
Figure 2:
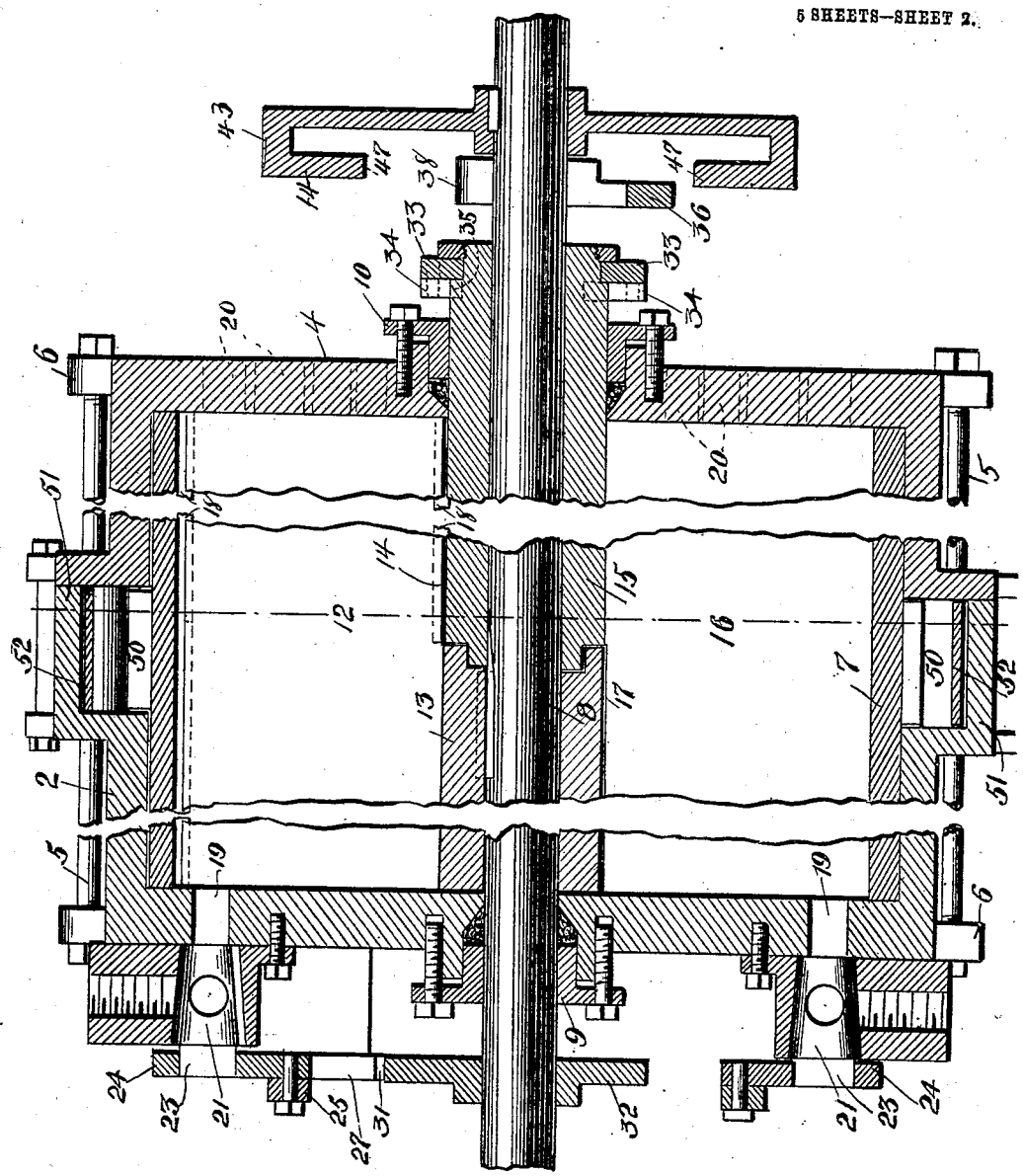
Figure 3:
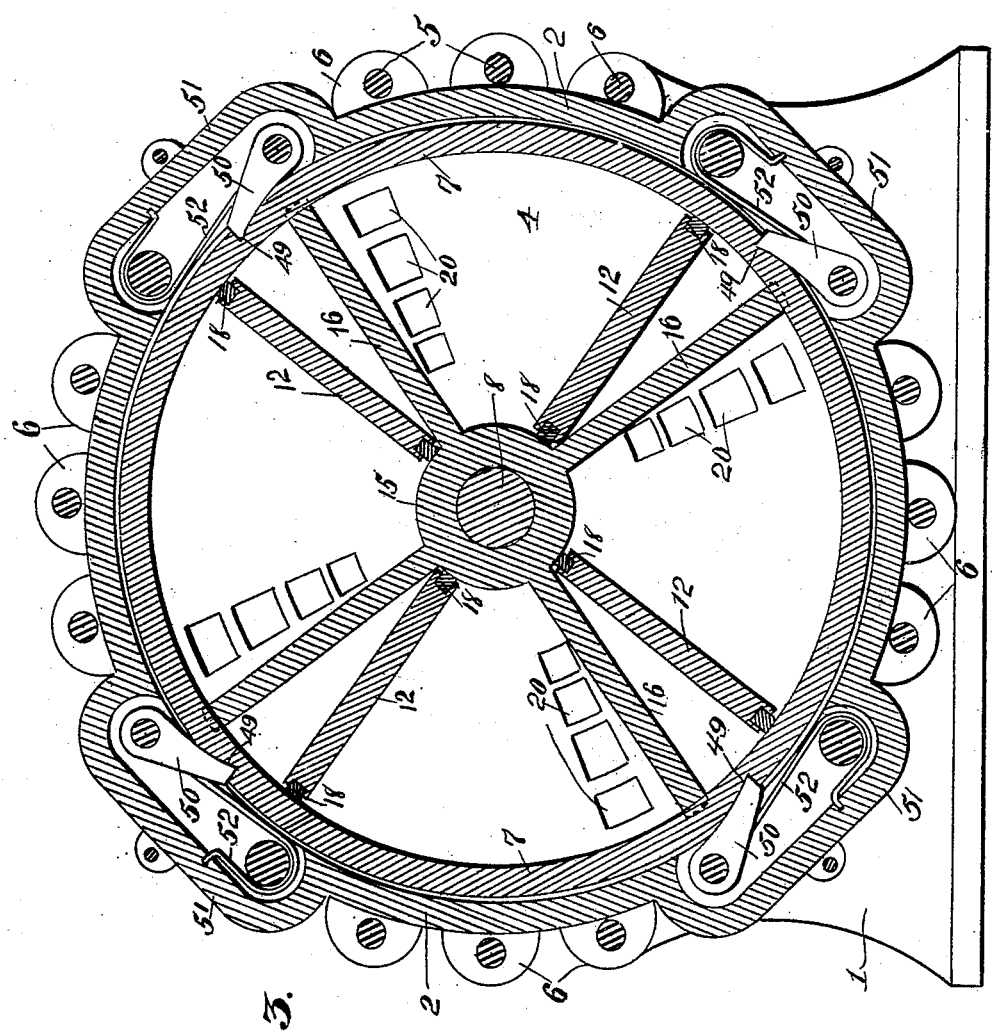
Figure 4:
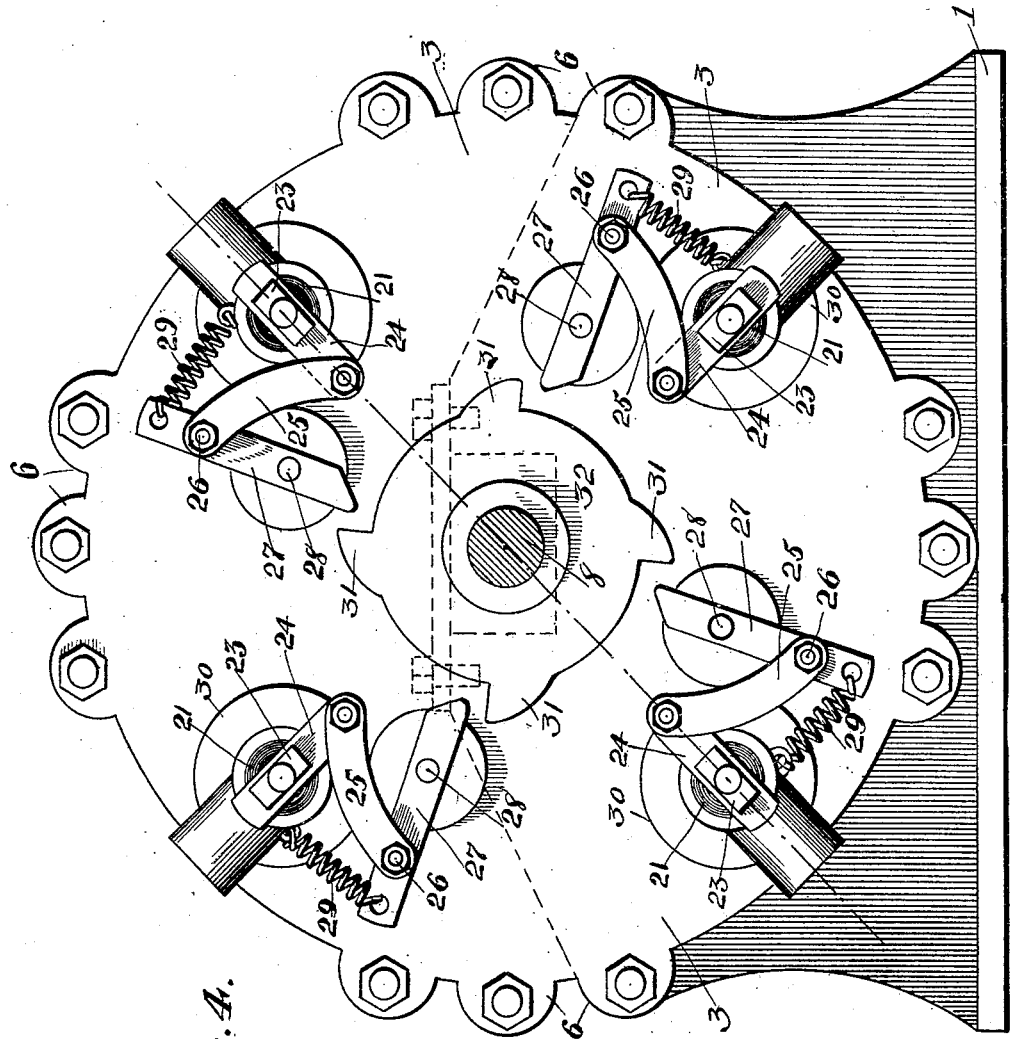
Figure 5:
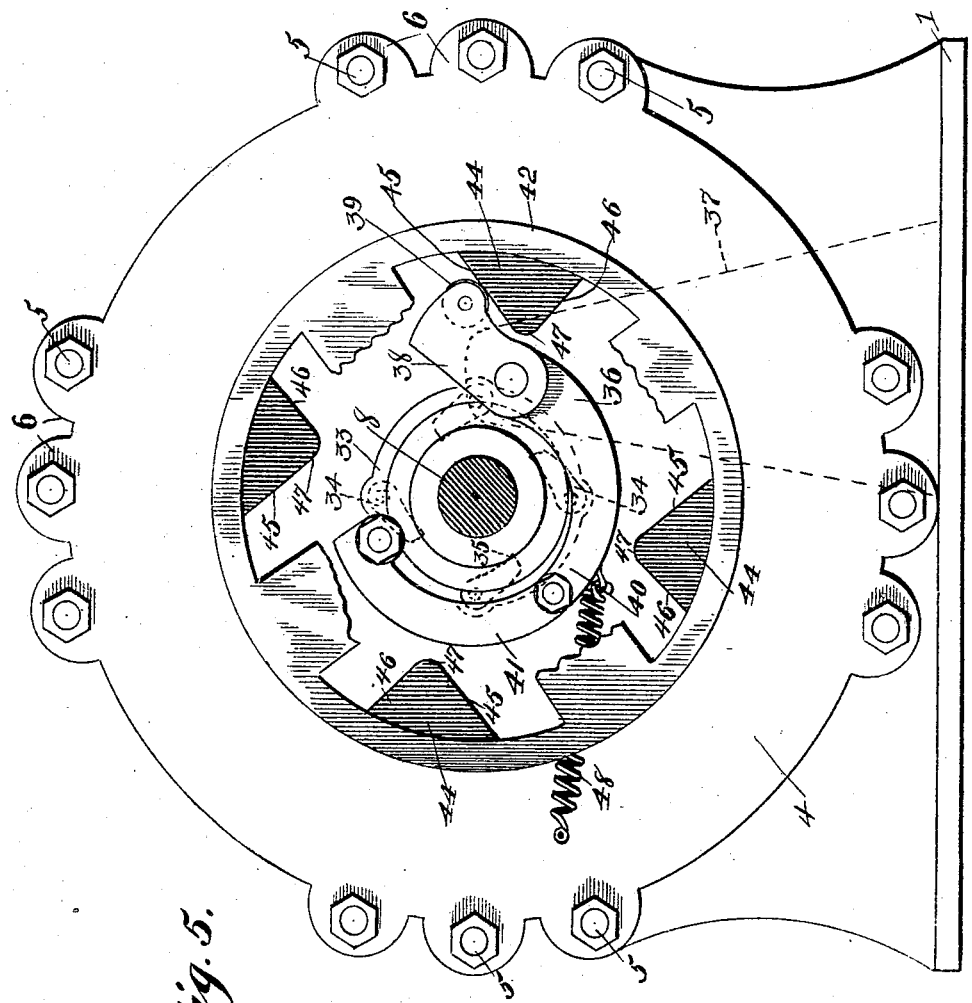

C. C. HOLLOWAY.
ROTARY ENGINE.
APPLICATION FILED JUNE 23, 1908.

915,296.

Patented Mar. 16, 1909.
5 SHEETS—SHEET 1.

Witnesses
D. E. Wilson
H. B. Martin

Inventor
CARLTON C. HOLLOWAY
By
William T. Jones
Attorney

C. C. HOLLOWAY.
ROTARY ENGINE.
APPLICATION FILED JUNE 23, 1908.

915,296.

Patented Mar. 16, 1909.
5 SHEETS—SHEET 3.

Witnesses

Inventor
CARLTON C HALLOWAY

By William T. Jones.

Attorney

C. C. HOLLOWAY.
ROTARY ENGINE.
APPLICATION FILED JUNE 23, 1906.

915,296.

Patented Mar. 16, 1909.
5 SHEETS—SHEET 5.

Witnesses
D. E. Wilson.
H. B. Martin

Inventor
CARLTON C HOLLOWAY

By William T. Jones,
Attorney

UNITED STATES PATENT OFFICE.

CARLTON C. HOLLOWAY, OF WASHINGTON, DISTRICT OF COLUMBIA.

ROTARY ENGINE.

No. 915,296.  Specification of Letters Patent.  Patented March 16, 1909.

Application filed June 23, 1908. Serial No. 439,929.

*To all whom it may concern:*

Be it known that I, CARLTON C. HOLLOWAY, a citizen of the United States, residing at Washington, in the District of Columbia, have invented certain new and useful Improvements in Rotary Engines, of which the following is a specification.

This invention relates to a rotary motor or engine particularly devised to fully and economically utilize the driving energy of a motive agent which may be either a fluid or liquid of suitable nature applied to the driving elements to the best advantage to continuously and effectively rotate a power shaft actuated by the driving elements as a unit without lost motion.

The principle involved in this motor is the direct action of the motive agent on movable driving elements fixed to a power transmitting shaft and the coöperation therewith of temporarily fixed elements which at intervals are moved, subsequent to the movement of the driving elements, with the motor cylinder to continuously form new motive agent receiving pockets regularly and consecutively occupying new positions within the inclosure. The pockets in their cycle rapidly move and receive the motive agent without the least fluctuation and all simultaneously receive uniform charges of the motive agent with obvious advantages in overcoming the obstructive influence of "dead center", and in materially reducing wear of the moving parts as well as insuring an effective and positive application of the motive agent. The motor is also equipped with rapid exhaust means so that no back pressure counteracts the regular rotation of the power generating elements.

Specifically the invention contemplates the association of coöperating mechanical devices contributing to the practical operation of the motor and which will be more fully hereinafter specified in preferred form, but subject to such modifications as fairly fall within the scope of the invention.

In the drawings:—Figure I is a side elevation of a rotary motor or engine broken away in parts and embodying the features of the invention. Fig. II is a longitudinal vertical section of the motor. Fig. III is a transverse vertical section. Fig. IV is an end elevation looking toward the motive agent inlet extremity, and Fig. V is an end elevation looking toward the extremity opposite that shown by Fig. IV.

Similar reference characters are used to designate corresponding parts in the several views.

The numeral 1 designates a suitable base fixedly supporting a tubular inclosure 2 having heads 3 and 4 preferably tied by rods 5 engaging bosses 6 on the heads and arranged at intervals around the inclosure. Within the inclosure 2 a cylinder 7 is rotatably mounted, and extending centrally through the heads is a power shaft 8 concentrically disposed with relation to the inclosure and cylinder, and provided with suitable stuffing boxes 9 and 10, secured to the heads 3 and 4, to obstruct leakage. Exteriorly of the heads 3 and 4 the shaft is supported by suitable pillars or uprights 11 rising from the base 1. At all points lubricating devices adapted for the purpose will be provided.

Freely movable within the cylinder 7 and secured to the shaft 8 are a plurality of driving elements in the form of flat radial wings 12 constituting the direct actuating means for the said shaft and shown for the purpose of practical illustration in the present instance as four in number. This number, however, may be varied in proportion to the dimensions of the motor. The radial wings 12 are secured to the shaft 8 through the medium of a hub 13 directly keyed to said shaft and have their inner edges for about one-half their length recessed as at 14 to freely move around a sleeve 15, loose on the shaft 8 and carrying radial pocket closers 16, secured at their outer edges to the cylinder 7, and movable with the latter. These closers 16 form movable walls or partitions and have their inner edges recessed as at 17 for about one-half their length, and reversely with relation to the recesses 14 of the wings 12 to freely move around the hub 13. The wings 12 and closers or walls 16 at their outer portions beyond the hub 13 and sleeve 15 extend fully from the inner surface of the head 3 to the corresponding surface of the head 4, and the inner and outer, as well as the end edges thereof, moving in contiguous relation to the parts specified, are provided with packing strips of any preferred form as at 18.

The wings 12 and closers or walls 16 are normally held in close relation as shown by Fig. III, to form pockets, and at regular intervals in the head 2, ingress ports 19 are formed and communicate with said pockets. Adjacent to the pockets and normally in the rear of the closers or walls 16 are radially arranged series of exhaust ports or openings 20 which outlet in any suitable escape conduit means, the said exhaust openings extending almost fully from the cylinder 7 to the hub 13 and sleeve 15 and are also formed in the head 2.

Coöperating with the ingress or feed ports 19 are a plurality of plug valves 21, one valve to each port, and controlling the open and closed condition of the feed pipe coupling members 22 and the simultaneous supply and cutoff of the motive agent to and from the several pockets formed by the wings 12 and closers or walls 16. The stems 23 of the valves 21 project outwardly and are engaged by slotted heads or keys 24 which project therefrom and have shifting levers 25 movably secured to their inner ends. The shifting levers 25 are intermediately fulcrumed as at 26 and also movably attached to tappet levers 27 projected inwardly and also intermediately fulcrumed as at 28. The levers are attached to the levers 27 between the outer ends of the latter and the fulcrums 28, and to the outer ends of the said levers 27, retractible springs 29 are secured and also attached to adjacent portions of the head 2 or the valve 30. The inner ends of the tappet levers 27 are located at the same distance from the axis of the motor for simultaneous engagement with the four teeth 31 of a tappet wheel or disk 32 carried by and rotatable with the shaft 8. This valve mechanism is so timed as to operate to opening the valves 21 just after the several pockets have been completed by the movement of the closers or walls 16 and instantaneously subsequent to the exhaust of the motive agent through the exhaust ports or openings 20, and which exhaust will be effected as soon as each wing 12 passes over said ports or openings 20.

The cylinder 7 is regularly rotated or moved around the wings 12 by a timed mechanism having an interval operation previous to the inlet of the motive agent into the pockets. This mechanism involves a ring 33 rotatably mounted on the exterior extremity of the sleeve 15, which projects through the head 3 on the inclosure, the said ring being freely rotatable on the hub and carrying a plurality of dogs 34 on its inner side, which are normally in engagement with the notches 35 in the adjacent portion of the said sleeve. Close to ring 33 an oscillating lever 36 is fulcrumed on an upright 37, rising from the base 1, the upper extremity 38 of said oscillating lever movably projecting above the upper end of the upright and carrying a roller 39. The opposite extremity 40 of the lever is curved and extends below the plane of the ring 33 and has the lower end of a pull lever 41 movably attached thereto, the upper end of the latter lever being secured to the ring 33.

The oscillating lever 40 together with the lever 41 and the ring 33 and dogs 34 constitute actuating means for the sleeve 20 carrying the closers or walls 16 and shifting the latter in timed relation to the movement of the wings 12, so as to consecutively and regularly complete the pockets for receiving the motive agent and utilizing the energy thereof. The actuating means for the sleeve 15, as just explained, is controlled as to its movement by a flanged fly wheel 42 which may be properly termed the controller, the flange 43 of the said fly wheel being disposed in concentric relation to the shaft 8 and is keyed to the latter, and consequently is regularly rotated by the said shaft in consonance with the movement of the wings 12. The flange 43 is formed at intervals with cam projections 44 which extend inwardly and which are formed with a long inclined edge 45 and a shorter edge 46 approximately at right angle to the edge 45 and continue into the latter by a rounded or curved apex 47. The edge 45 of each cam projection is engaged by the roller 39 on the upper end of the oscillating lever 36, said edge of each cam projection constituting the means for actuating the lever 36, and the edge 46 forming the drop or release edge of each cam projection. Four of the cam projections are shown by Fig. V arranged at regular intervals to operate with the oscillating lever 36, and said projections are so disposed in connection with the controller or fly wheel 42 that they will engage the roller 39 and oscillate the lever 36 immediately after the wings 12 have passed over the exhaust openings 20, and form with the said wings complete pockets with which the ingress ports 19 centrally communicate as particularly shown by Fig. III. The oscillating lever 36 operates against the resistance of a retractile spring 48 secured to the outer edge thereto, adjacent to the point of attachment thereto of the pull lever 41 and also to the head 3. This spring 48 operates to restore the lever 36, and parts combining therewith, to normal position when the roller 39 clears the edge 45 and apex 47 of each cam projection 44.

The operation of the actuating means and controller is very simple but at the same time positive. When the lever 36 is oscillated by either of the cam projections 44 the upper extremity 38 thereto is thrown inwardly and the lower extremity is moved out against the resistance of the spring 48 and exerts a drawing force on the pull lever 41 from the time that the roller 39 starts from the base of the edge 45 of each cam projection until said roller clears the projection. This drawing action set up with respect to the lever 41 is transmitted to the ring 33 and the latter, through the pockets 34 rotates the sleeve 15 and the closers or walls 16 in the direction of rotation of the shaft 8 and the wings 12, and the parts are so proportioned that just as the roller 39 clears each cam projection 44 and the actuating means oscillate to normal position, the closers or walls 16 will occupy proper positions with relations to the previously advancing wings 12. The movement of the closers or walls 16 also sets up a corresponding rotation of the cylinder 7 in view of the fact that the said closers or walls are secured to the cylinder as hereinbefore explained, and in order to prevent this cylinder from having back movement, it is provided at intervals with notches 49 to receive dogs 50, held at the center of the inclosure 2, within housings 51, as clearly shown by Figs. II and III. The dogs 50 are continually pressed by springs 52 which hold said dogs in engagement with the notches 49, and as the cylinder 7 is rotated regularly with the closers or walls 16 the dogs 50 take into the several notches 49 which will be in position for engaging with the dogs at the time when the closers or walls 16 are adjacent or in relative positions to the wings 12, or just when the pockets have been reëstablished.

Power may be taken from the shaft 8 by any suitable means, a band wheel or pulley 53 being shown for this purpose in Fig. I.

The motive agent, as hereinbefore indicated may either have expansive characteristic or be of a fluid nature, and move the wings 12 at the corresponding operating parts by pressure. It is preferred, however, that steam be used as the motive agent. Whatever may be the nature of the motive agent the operation will be the same, as may be summarized as follows: The entrance of the motive agent into the several pockets between the wings 12 and the closers or walls 16 cause the wings to move away in advance of the closers or walls until the exhaust ports or openings 20 are passed, and during this movement of the wings the actuating means, embodying the controller having the cam projections 44 and the levers 36 and 41 and the ring 33 with the dogs 34, will be in position for operation of the cam projection 44 at the time that will come into service with respect to the roller 39 which will be advancing toward the said roller, and almost instantly this actuating mechanism will be set in operation to throw up the closers or walls 16 adjacent to the advance wings. As this operation becomes rapid it is accelerated proportionately to the increased speed of rotation of the shaft 8, and then as the closers or walls 16 arrive in place the plug valves 21 will be shifted or turned to open up communication between the supply and the ingress ports 19, hence the several operations will regularly take place in sequence at proper intervals and the shaft 8 will have a continuous rotation imparted thereto.

The improved rotary engine or motor is exceptionally effective as a driving means, and economically, in the use of a motive agent shaft, in view of the removable or counteracting resistances to the said rotation of the shaft 8 and the reliability of the operation of the several mechanisms in direct relation will be conducive to the general efficiency of the engine or motor.

Having thus described the invention, what is claimed, is:

1. In a rotary motor of the class specified, a central drive shaft, a cylinder rotatable about the said shaft, an inclosure having inlet ports at one end, means automatically controlled by the shaft for permitting motive fluid to simultaneously pass into and through all the ports, and pockets rotatably disposed around the shaft and involving members in part secured to and movable with the shaft and cylinder respectively, the inlet ports opening centrally with relation to the several pockets.

2. In a rotary motor of the class specified, a central drive shaft, an inclosure having inlet ports at regular intervals therearound, independently movable elements arranged in relative pairs and rotatable fully around the interior of the inclosure and forming pockets, each pocket coöperating with an inlet port, means actuated by the shaft for controlling the simultaneous open and closed condition of the ports, and a rotatable cylinder, the elements operating the shaft and the latter rotating the cylinder.

3. A rotary motor having motive agent receiving pockets which continually change position therein and each coöperating with an inlet port supply controlling valves for the several ports, a power shaft, means actuated by the shaft for simultaneously opening the valves and admitting motive agent to the ports and pockets, and a rotatable cylinder, the pockets actuating the shaft and the latter operating the cylinder.

4. In a rotary motor of the class specified, a power shaft, a cylinder rotatable about the shaft, an inclosure for the cylinder, having a plurality of inlet ports wings secured to the shaft and rotatable in the cylinder, movable walls secured to the cylinder and rotatable around the shaft, the wings and walls forming pockets within the cylinder, and the pockets individually coöperating with the ports and means controlled by the shaft for simultaneously supplying motive agent to the pockets and ports.

5. In a rotary motor of the class specified, a power shaft, a cylinder rotatable about the shaft, an inclosure for the cylinder, means in part secured to the shaft and cylinder for forming motive agent receiving pockets in the cylinder and partially movable with and around in the latter, normally closed valves controlling the supply of motive agent to the pockets, means operated by the shaft for opening said valves, actuating means for the cylinder, and a controller carried by the shaft and having cam projections for operating said actuating means at timed intervals.

6. In a rotary motor of the class specified, a power shaft, a cylinder rotatable about the shaft, an inclosure for the cylinder, means in part secured to the shaft and cylinder for forming motive agent receiving pockets, in the cylinder and partially movable with and around in the latter, valves actuated by the shaft for controlling the supply of motive agent to the pockets, means actuated by the shaft for operating the cylinder and means for preventing back movement of the cylinder.

7. In a rotary motor of the class specified, a power shaft, a cylinder rotatable about the shaft, an inclosure for the cylinder having a plurality of inlet ports, means in part secured to the shaft and cylinder for forming motive agent receiving pockets in the cylinder and partially movable with and around in the latter, the pockets and inlet ports being equal in number, and valves simultaneously opened by the rotation of the shaft to admit motive agent through the ports into all of the pockets.

8. In a rotary motor of the class specified, a power shaft, a cylinder rotatable about the shaft, an inclosure for the cylinder having a plurality of inlet ports, means in part secured to the shaft and cylinder for forming motive agent receiving pockets in the cylinder and partially movable with and around in the latter, each pocket having a coöperating inlet port, and means controlled by the rotation of the shaft for simultaneously admitting motive agent through the ports into all of the pockets.

9. In a rotary motor of the class specified, a power shaft, a cylinder rotatable about the shaft, an inclosure for the cylinder having a plurality of inlet ports, means in part secured to the shaft and cylinder for forming motive agent receiving pockets in the cylinder and partially movable with and around in the latter, each pocket having a coöperating inlet port, means controlled by the rotation of the shaft for admitting motive agent through the ports and simultaneously into all the pockets, and means also controlled by the rotation of the shaft for rotating the cylinder.

10. In a rotary motor of the class specified, a power shaft, a cylinder rotatable about the shaft, an inclosure for the cylinder, pockets in part secured to the shaft and cylinder, and rotatable in the latter, means for supplying motive agent to the pockets and operated by the shaft, actuating means for the cylinder consisting of movably connected levers connected to the cylinder and provided with an outer bearing extremity, and a fly wheel on the shaft having cam devices with which said bearing extremity has contact.

11. In a rotary motor of the class specified, a power shaft, a cylinder rotatable about the shaft, pockets in part secured to the shaft and cylinder and rotatable fully around in the latter, means for supplying motive agent to the pockets, actuating means for the cylinder, and a fly wheel on the shaft having projecting devices for engaging said actuating means.

In testimony whereof I hereunto affix my signature in presence of two witnesses.

CARLTON C. HOLLOWAY.

Witnesses:
 HARRY H. JOHNSON,
 Z. I. NUTT.